United States Patent
Gil

Patent Number: 6,094,611
Date of Patent: Jul. 25, 2000

[54] FUZZY CONTROL METHOD OF DAMPER CLUTCH

[75] Inventor: Sung-Hong Gil, Seoul, Rep. of Korea

[73] Assignee: Hyundai Motor Co., Ltd., Seoul, Rep. of Korea

[21] Appl. No.: 08/773,178

[22] Filed: Dec. 27, 1996

[30] Foreign Application Priority Data

Dec. 29, 1995 [KR] Rep. of Korea ................. 95-66793

[51] Int. Cl.[7] .................................................. B60K 41/02
[52] U.S. Cl. ........................ 701/57; 701/57; 701/67; 477/155; 477/143; 477/174; 477/169; 477/175; 477/180; 477/181; 364/148; 364/424.1; 192/3.58; 192/3.62
[58] Field of Search ............... 701/57, 67; 477/174, 477/169, 155, 143, 154, 175, 180, 181; 364/424.1, 148; 192/4, 3.58, 3.62; 74/866

[56] References Cited

U.S. PATENT DOCUMENTS

| | | | |
|---|---|---|---|
| 4,841,815 | 6/1989 | Takahashi | 74/866 |
| 5,323,318 | 6/1994 | Hasegawa et al. | 364/424.1 |
| 5,358,317 | 10/1994 | Cikanek | 303/152 |
| 5,410,477 | 4/1995 | Ishii et al. | 701/48 |
| 5,588,515 | 12/1996 | Toyama et al. | 192/4 |
| 5,620,393 | 4/1997 | Minowa et al. | 477/155 |
| 5,743,829 | 4/1998 | Tanizawa et al. | 477/174 |
| 5,745,361 | 4/1998 | Kim et al. | 364/148.05 |
| 5,776,031 | 7/1998 | Minowa et al. | 477/155 |
| 5,792,024 | 8/1998 | Yeo | 477/174 |
| 5,833,579 | 11/1998 | Ghil | 477/169 |

OTHER PUBLICATIONS

A brief course in fuzzy logic and fuzzy control, authors: Peter Bauer, Stephan Nouak and Roman Winkler. Date Feb. 2, 1996. 9 pages sent.

*Primary Examiner*—William A. Cuchlinski, Jr.
*Assistant Examiner*—Olga Hernandez

[57] ABSTRACT

A fuzzy control method of a damper clutch and, more particularly, a fuzzy control method enhances engine brake effect by directly connecting a pump to a turbine by engaging the damper when a shift control unit identifies an engine brake state. The fuzzy control method of a damper clutch includes receiving or checking input signals relating to a damper clutch; controlling shift timing by a fuzzy control; determining if an engine brake should be used or not; checking an amount of driver's engine brake will if the engine brake should be used; determining if an emergency brake should be used or not; engaging the damper clutch when an emergency brake should be used; and controlling the damper clutch through a normal control when both the engine brake and emergency brake are not used.

16 Claims, 6 Drawing Sheets

FUZZY CONTROL METHOD OF DAMPER CLUTCH

FIELD OF THE INVENTION

The present invention relates to a fuzzy control method of a damper clutch and, more particularly, to a fuzzy control method which can enhance engine brake effect by directly connecting a pump to a turbine by engaging the damper when a shift control unit identifies an engine brake state.

BACKGROUND OF THE INVENTION

Generally, an electronically controlled automatic transmission achieves the automatic shift operation in accordance with a fixed shift pattern as shown in FIG. 1.

That is, the automatic transmission determines each speed ratio in accordance with a fixed shift pattern programmed in a computer (i.e., a transmission control unit ("TCU")), while the manual transmission performs the shift operation according to the driver's will.

Therefore, since the shift timing is determined by the fixed shift pattern, the engine brake effect cannot be obtained.

For example, in the shift pattern of the convention al automatic transmission, as shown in FIG. 1, the X-axis represents the number of rotation of the transfer gear of vehicle speed and the Y-axis represents a throttle opening relating to an amount the accelerator is depressed by the driver.

The automatic transmission is used on many rear-wheel-drive and four-wheel-drive vehicles. Automatic upshifts and downshifts are a convenience for the driver because a foot-operated clutch is not required to shift gears and because the vehicle can be brought to a stop without the use of a clutch and without shifting the transmission into neutral.

An automatic transmission as illustrated in FIG. 2 comprises a torque converter, an A/T 22 having a TCU and a hydraulic control system, and a planetary gear unit.

As shown in FIG. 3, the torque converter transmits driving force of the engine to a transmission and has a function as a flywheel of a manual transmission. In addition, the torque converter boosts engine torque when starting and accelerating the vehicle and absorbs the torque change, thereby providing improved ride comfort.

The torque converter is filled with the fluid therein, and by using centrifugal force of the fluid, transmits rotating force of the engine to wheels while absorbing the impact and distortion of the crankshaft.

The pump or impeller 32 converts the rotating force of the engine into the centrifugal force, and transmits the centrifugal force to the turbine 31, which transmits the centrifugal force of the fluid transmitted from the pump 32 to an input shaft 35. A stator 33 converts a direction of the fluid transmitted from the turbine 31 and the transmitted fluid is used to increase the torque.

In recent years, a new control method, for example, a fuzzy control or a neutral control method, has been used for controlling the automatic transmission vehicle so as to perform the shift operation.

Although, this kind of control algorithm is very effective through a control of the shift timing under various road driving states, when an emergency circumstance occurs, that is an engine brake is required during driving a vehicle, since all the conventional control method controls the damper clutch to be released, the engine brake effect deteriorates.

In the conventional damper clutch control method is for improving the fuel consumption ratio. That is, by controlling the pump and turbine to be integrated to each other, the damper clutch is engaged in a predetermined range obtained through a test as shown in FIG. 4.

SUMMARY OF THE INVENTION

Therefore, the present invention has been made in an effort to solve the above described problems of the conventional art.

It is an object of the present invention to provide a fuzzy control method of damper clutch, which can enhance engine brake effect by directly connecting a pump to a turbine by engaging the damper when a shift control unit identifies an engine brake state.

To achieve the above object, the present invention provides a fuzzy control method of a damper clutch, comprising the steps of:

receiving or checking input signals relating to a damper clutch;

controlling shift timing by a fuzzy control;

determining if an engine brake should be used or not;

checking an amount of driver's engine brake will if the engine brake should be used;

determining if an emergency brake should be used or not;

engaging the damper clutch when an emergency brake should be used; and controlling the damper clutch through a normal control when both the engine brake and emergency brake are not used.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 5:
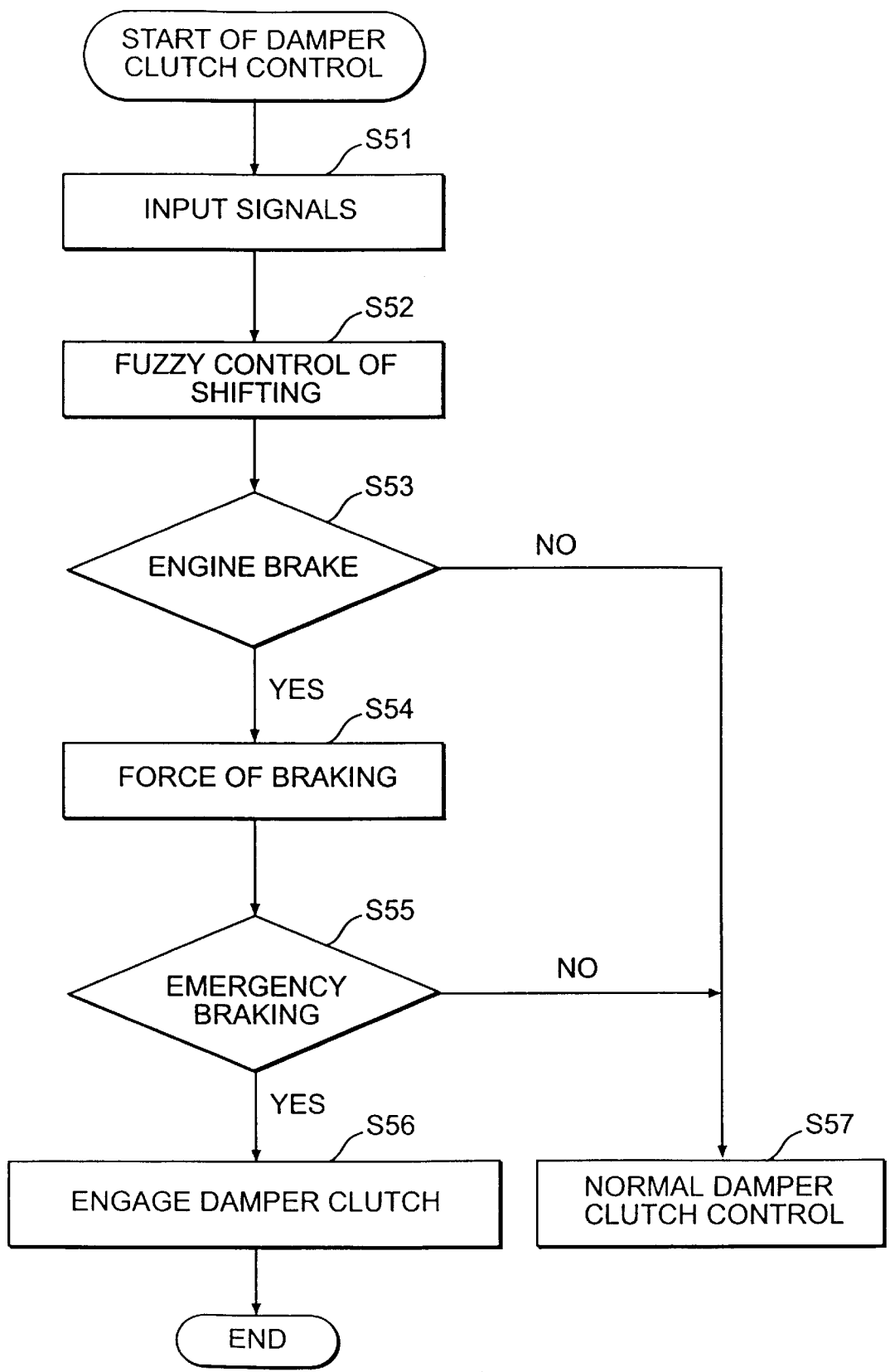
FIG. 5 is a flow chart illustrating a fuzzy control method of a damper clutch according to a preferred embodiment of the present invention.

Referring first to FIG. 5, there is shown a flow chart illustrating an engine brake control method according to a preferred embodiment of the present invention.

The method comprises the steps of:

(S51) receiving or checking input signals relating to a damper clutch;

(S52) controlling shift timing by a fuzzy control;

(S53) determining if an engine brake should be used or not;

(S54) checking an amount of the driver's engine brake will if the engine brake should be used;

(S55) determining if an emergency brake should be used or not;

(S56) engaging the damper clutch when an emergency brake should be used; and (S57) controlling the damper clutch through a normal control when both the engine brake and emergency braking are not used.

The operation of the damper clutch fuzzy control method as described will be as follows:

First, when the electric power is turned ON, the operation of the damper clutch fuzzy control starts.

When starting the fuzzy control, the shift control unit receives input signals relating to the damper clutch or check the input signals (S51), and then controls the shift timing by a fuzzy control (S52).

Next, the shift control unit determines if the engine brake should be used or not (S53), and if the engine brake should be used, the unit checks the driver's engine brake will (S54).

The unit determines if the emergency brake should be used or not (S55), and if the emergency brake should be used, operates the damper clutch (S56) to directly connect the pump to the turbine, to thereby improve the engine brake effect.

In addition, if the engine brake or the emergency brake is not used, the damper clutch is controlled by a normal control (S57).

A shift pattern fuzzy control and a damper clutch control will be described more in detail hereinafter.

Figure 6:
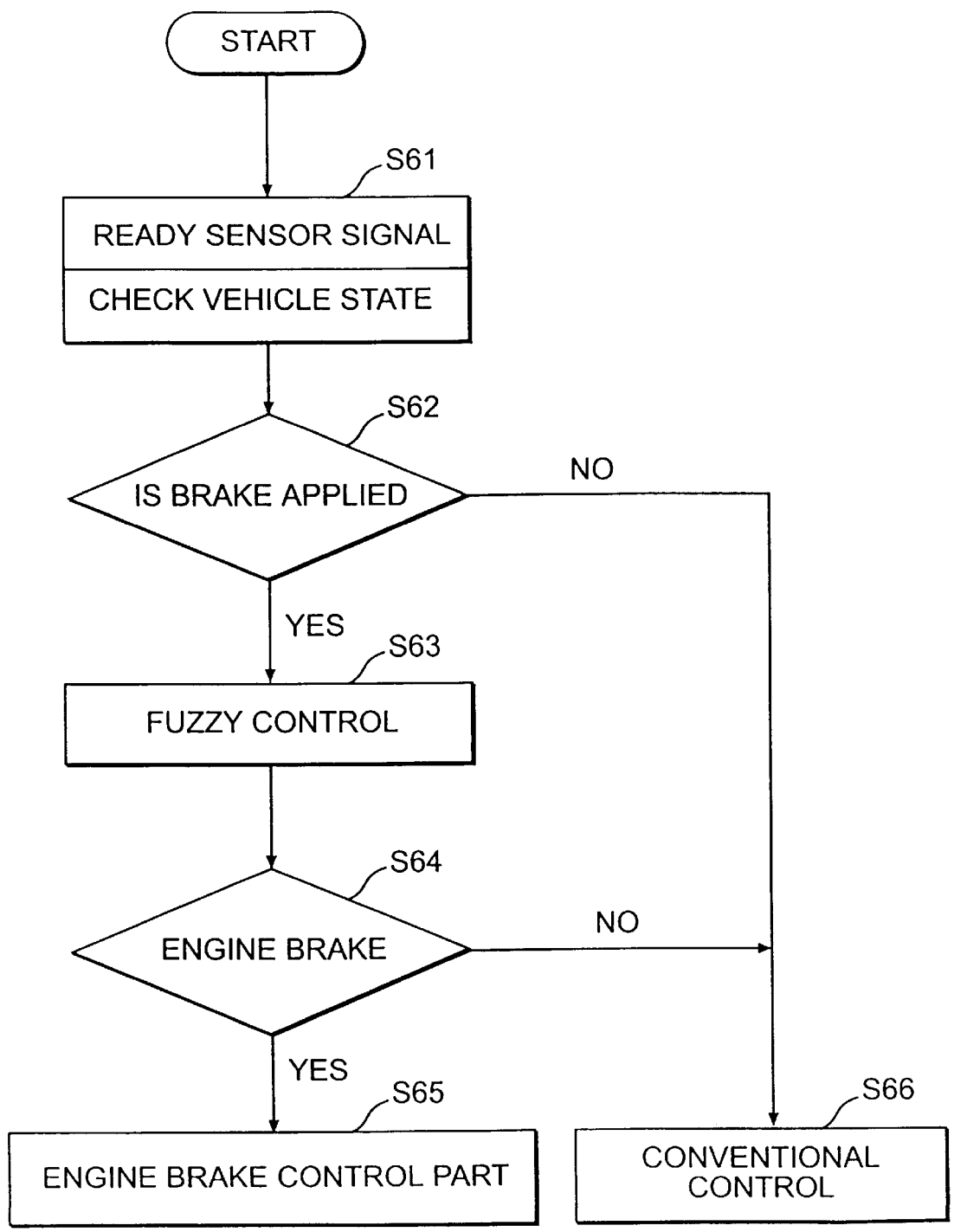
FIG. 6 is a flow chart illustrating an engine brake control method according to a preferred embodiment of the present invention.

FIG. 6 shows a flow chart of the engine brake control. The fuzzy control process for determining if the engine brake should be used or not with respect to the conventional shift pattern can be described as follows:

(1) when a circumstance where the engine brake is required occurs, the control unit reads information relating to the vehicle's running state and determines if it should perform the shift operation according to the current shift pattern or not;

(2) If the shift operation is performed according to the current shift pattern, the control unit identifies if a brake signal exists or not;

(3) After checking all circumferences, the control unit identifies if the engine brake is required or not through a fuzzy control before the shift operation is performed according to the current shift pattern;

(4) If it is identified through the fuzzy control that the driver requires the engine brake, the shift operation does not occur, and that the driver does not require the engine brake, the shift operation is performed according to the current shift pattern.

Figure 7:
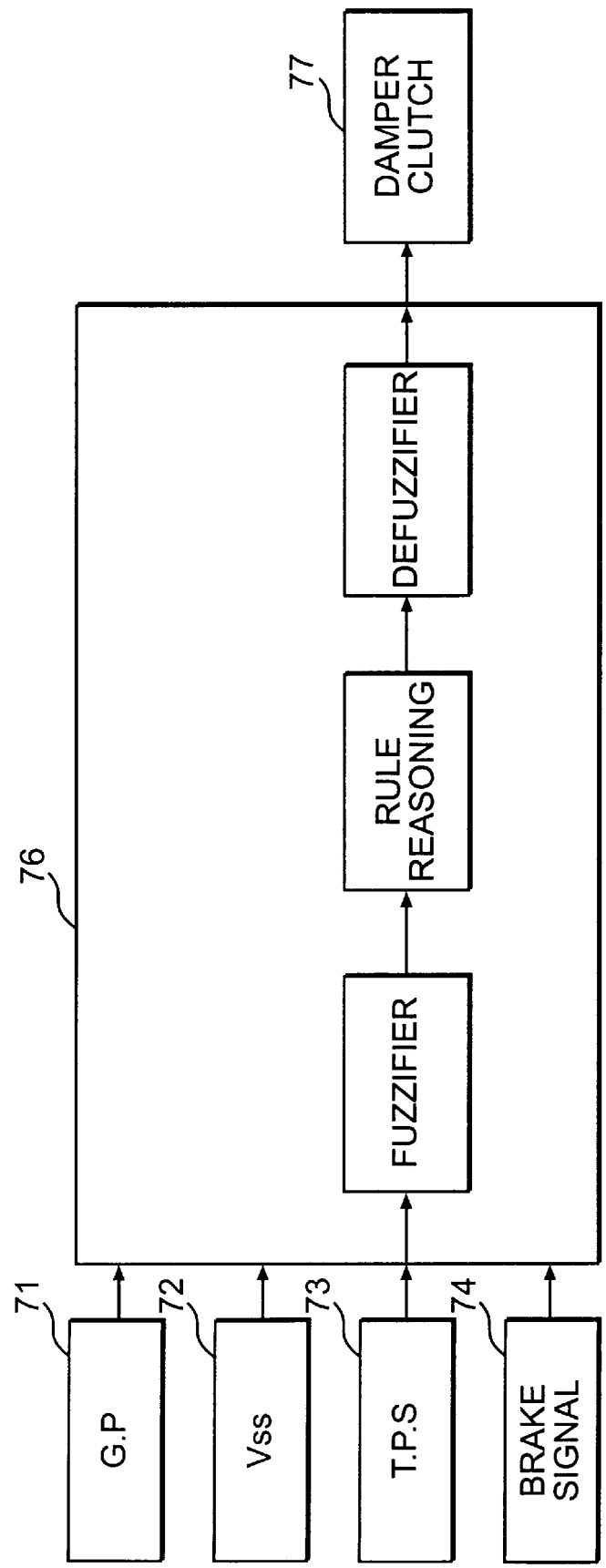
FIG. 7 is a diagram illustrating a fuzzy control of the engine brake according to a preferred embodiment of the present invention.
Figure 8:
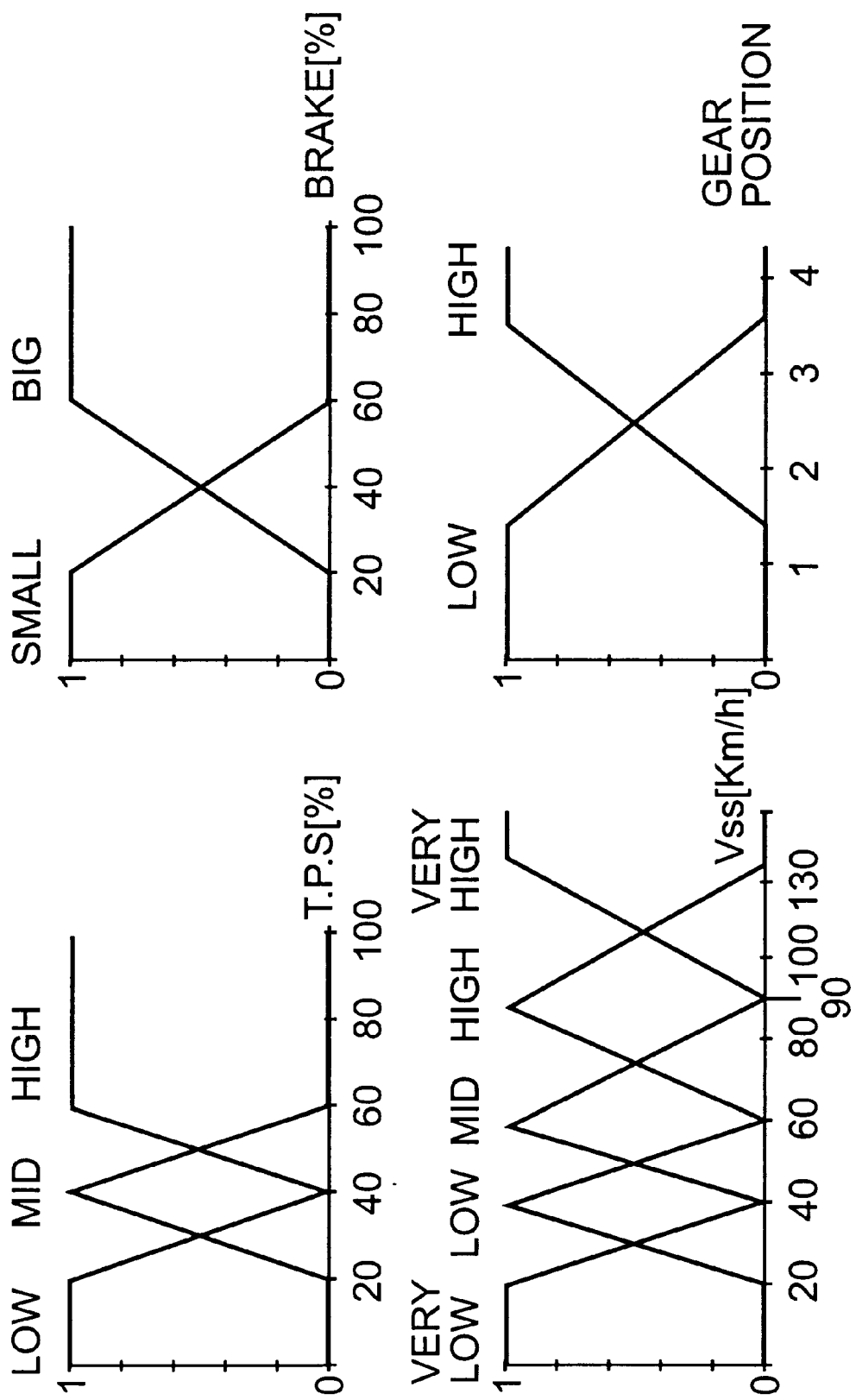
FIG. 8 is a graph illustrating a membership function of a preferred embodiment of the present invention.

FIG. 7 shows an engine brake fuzzy control with respect to various input signals.

That is, the control unit identifies how much the engine brake is needed by the driver through a speed ratio before the shift operation is performed, a current vehicle speed, a throttle valve opening, a brake signal, and makes the vehicle drive with an optimal speed ratio while obtaining the engine brake effect.

In addition, following is a membership function, which is a function converted within a universe of discourse so as to fuzzy-reason a non-fuzzy representation calculated by a processor, and which is used for reasoning the driver's will through a fuzzy reasoning.

The process of the fuzzy reasoning will be described hereinbelow.

It should be noted that control rules used in the processor are composed of a set of conditional phrases, which are linguistically represented.

That is, the conditional phrases such as "IF" and "THEN" are used and a truth value of a pre-condition part with respect to each rule indicates a degree of weight by which result of each of the rules affects the output.

The fuzzy reasoning introduces the membership function to the control rules and calculates the membership function of the control input by using the membership function with respect to the input which is measured by the processor. The fuzzy reasoning is performed under the following predetermined control rules.

Rule 1: IF input 1 is $A_{11}$ and input 2 is $A_{12}$ and input 3 is $A_{13}$ and input 4 is $A_{14}$, THEN $V_1 = B_1$.

Rule K: IF input 1 is $A_{K1}$ and input 2 is $A_{K2}$ and input 3 is $A_{K3}$ and input 4 is $A_{K4}$, THEN $V_K = B_K$.

Rule N: IF input 1 is $A_{N1}$ and input 2 is $A_{N2}$ and input 3 is $A_{N3}$ and input 4 is $A_{N4}$, THEN $V_N = B_N$.

where, $A_{K1}$ is a LABLE represented as a set of fuzzy representing a degree of membership of an input variable;

$B_K$ is a real number value representing a degree of the engine brake with respect to an input variable in the Rule K;

Input 1 is an input variable; and $V_K$ is an output variable.

A positive value of the $B_K$ represents that the driver requires the engine brake, and a negative value of the $B_K$ represents that the driver does not require the engine brake.

In addition, a degree of adaptability of the Rule K are as follows:

$$VK = \min[\mu_{AK1} \text{ (G.P)}, \mu_{AK2} \text{ (VSS)}, \mu_{AK3} \text{ (TPS)}, \mu_{AK4} \text{ (Brake)}]$$

During a course of converting a fuzzy control input into a Crisp control required for controlling the processor, the index number can be obtained by the following equation:

$$V = \sum_K (/V_K) * B_K \Big/ \sum_K (/V_K)$$

If the V is higher than X-VARIABLE, the driver's will is represented in accordance with the amount of the V.

If the V is less than X-VARIABLE, it represents that the driver performs that shift operation in accordance with an existing shift pattern.

In addition, the damper clutch will be controlled as follows:

Since the damper clutch is controlled to be engaged just in case that the driver's will coefficient obtained by the fuzzy control of the shift pattern is higher than a fixed coefficient, more improved engine brake effect can be obtained.

This can be illustrated by the following equation:

$$V = \sum_K (/V_K) * B_K \Big/ \sum_K (/V_K)$$

That is, if the V is higher than X-VARIABLE+K, this represents that the driver's engine brake will is higher and the damper clutch is engaged.

If the V is less than X-VARIABLE+K, this represents that the driver's engine brake will is very small and the damper clutch is controlled in accordance with the existing shift pattern.

While the invention has been described in connection with what is presently considered to be the most practical of preferred embodiments, it is to be understood that the invention is not limited to the disclosed embodiments, but, on the contrary, it is intended to cover various modifications and equivalent methods included within the spirit and scope of the appended claims.

Figure 1:
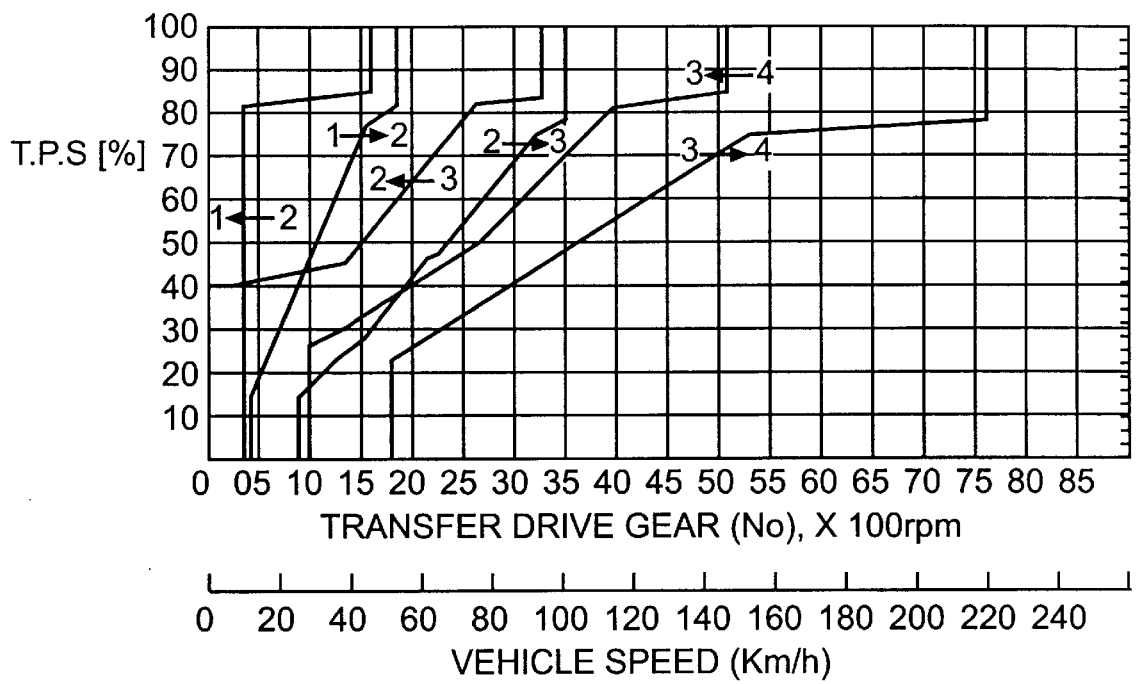
FIG. 1 is a graph illustrating a shift pattern of a conventional automatic transmission.
Figure 2:
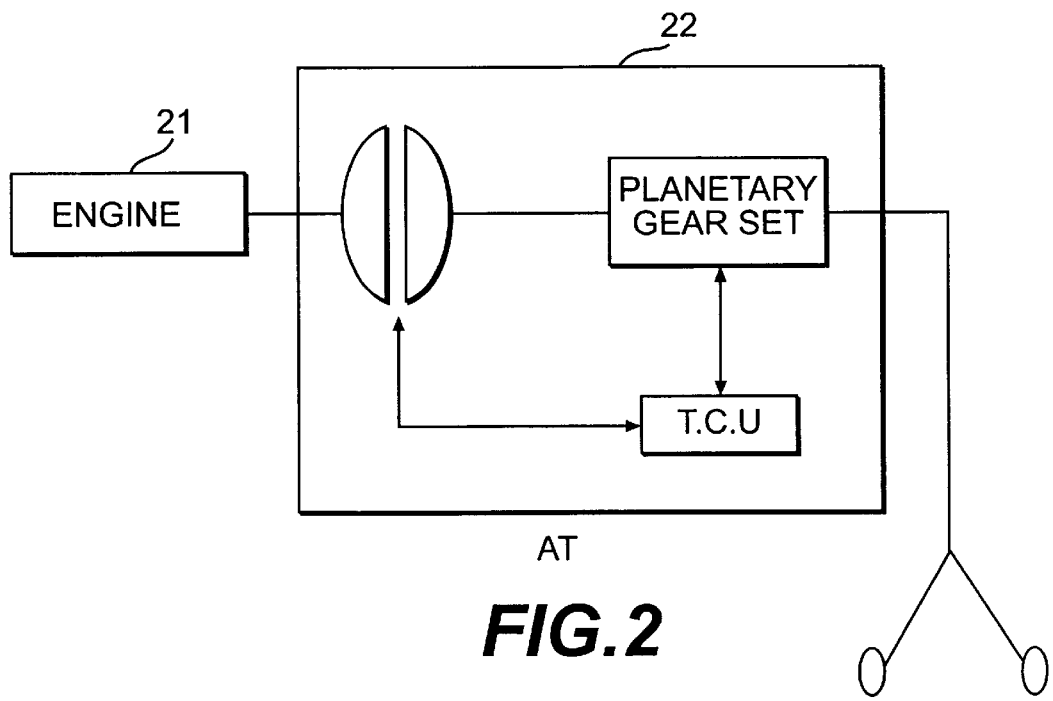
FIG. 2 is a diagram illustrating a conventional automatic transmission.
Figure 3:
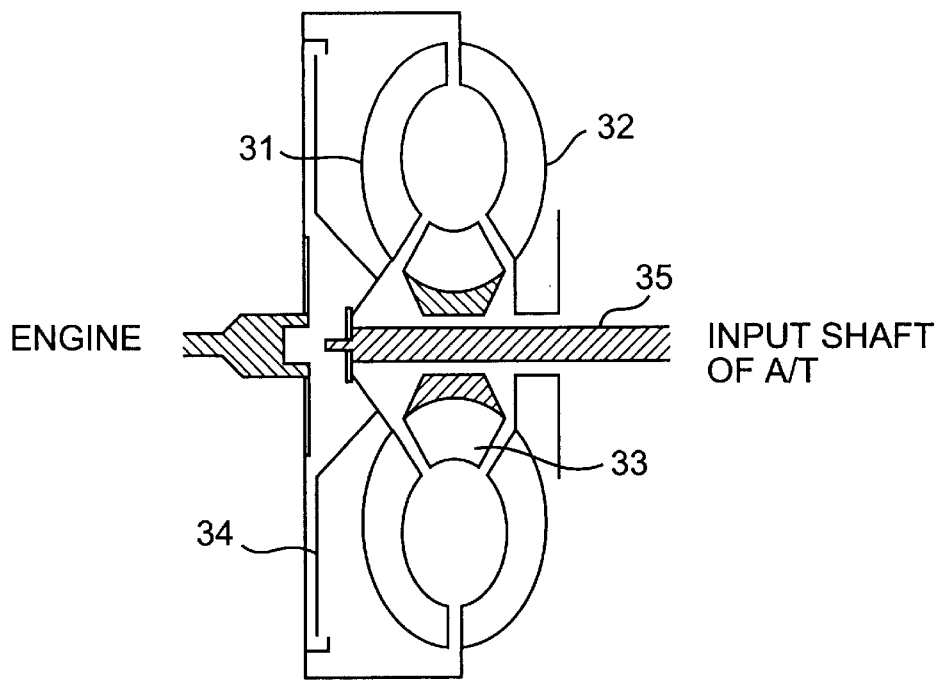
FIG. 3 is a diagram illustrating a conventional torque convertor.
Figure 4:
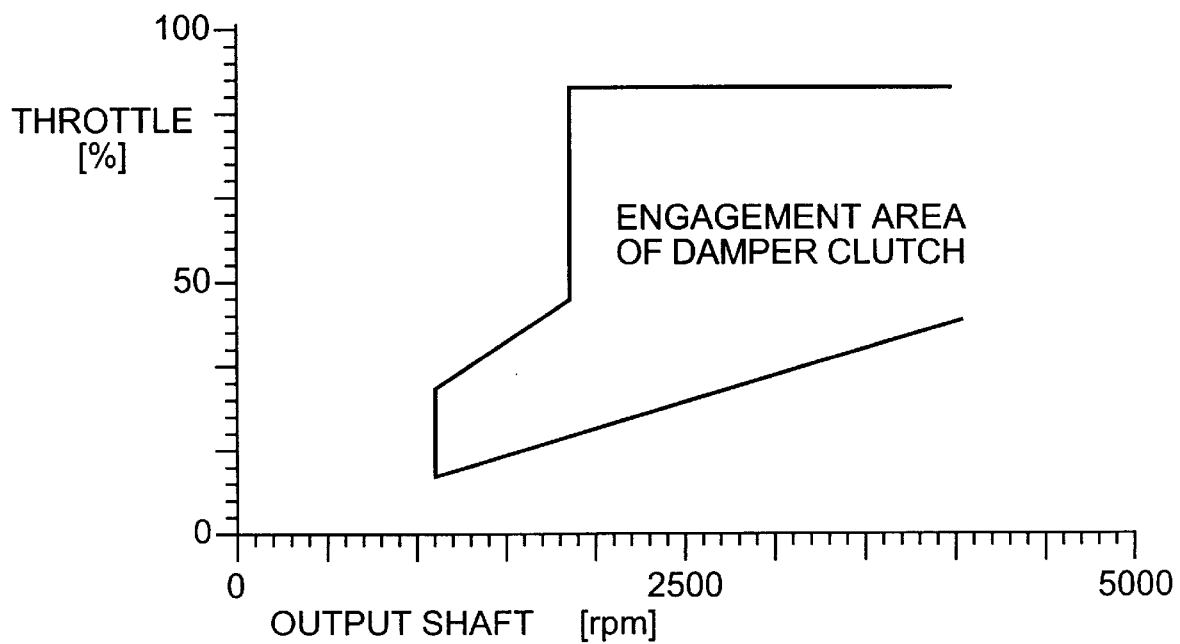
FIG. 4 is a graph illustrating an engagement range of a conventional damper clutch.

Drawing
FIG. 1
Shift Pattern
FIG. 2
21 engine
Oil gear set
FIG. 3
Engine
Input shaft
FIG. 4
Throttle opening
Damper clutch operating area
Engine speed
FIG. 5
Start controlling Damper clutch
S51 Read and Check out Input signal relating to Damper clutch
S52 Control shift timing by a fuzzy control;
S53 Engine Brake?
S54 Check an amount of driver's engine brake will
S55 Emergency brake?
S56 Engage damper clutch
S57 Control damper clutch through a normal control
End
FIG. 6
Start
S61 Read out sensor input
S62 Brake condition?
S63 Fuzzy control
S64 Engine brake?
S65 Engine brake control portion
S66 Normal portion

What is claimed is:

1. A method of controlling a damper clutch of a vehicle to effect engine braking, comprising:
   (a) sensing a plurality of vehicle operating conditions;
   (b) inferring, using fuzzy logic, whether to apply the damper clutch to effect engine braking based on the sensed vehicle operating conditions of said step (a) including a membership function; and
   (c) controlling the damper clutch based on the inference of said step (b).

2. The method of controlling a damper clutch of claim 1, further comprising:
   (d) determining whether a brake of the vehicle is being applied,
   wherein said step (b) of inferring occurs only upon determination in said step (d) that the brake of the vehicle is being applied.

3. The method of controlling a damper clutch of claim 1, wherein said step (c) comprises disengaging the damper clutch when the membership function of a fuzzy logic based on vehicle operation represents an engine braking state or an emergency braking state.

4. The method of controlling a damper clutch of claim 1, wherein the membership function includes gear position, throttle valve position, degree of brake operation and vehicle speed.

5. The method of controlling a damper clutch of claim 1, further comprising:
   (d) determining whether to shift an automatic transmission of the vehicle based on the sensed vehicle operating conditions; and
   (e) prohibiting a shift determined in said step (d) upon determination in said step (b) to apply the damper clutch.

6. The method of controlling a damper clutch of claim 5, wherein said step (d) is performed using fuzzy logic.

7. The method of controlling a damper clutch of claim 1, wherein said step (b) comprises:
   (b1) inferring, using fuzzy logic, whether to effect engine braking;
   (b2) inferring, using fuzzy logic, an amount of braking desired by an operator of the vehicle; and
   (b3) determining to apply the damper clutch when results of said steps (b1) and (b2) indicate that emergency braking should be performed.

8. The method of controlling a damper clutch of claim 7, further comprising:
   (d) determining whether to shift an automatic transmission of the vehicle based on the sensed vehicle operating conditions; and
   (e) controlling the automatic transmission according to determination in said step (d) when one of said step (b1) does not determine to effect engine braking and said step (b3) does not determine to apply the damper clutch.

9. An apparatus for controlling a damper clutch to effect engine braking, comprising:
   sensing means for sensing a plurality of vehicle operating conditions;
   inference means for inferring, using fuzzy logic, whether to apply said damper clutch to effect engine braking based on the sensed vehicle operating conditions including a membership function; and
   control means for controlling said damper clutch based on the inference by said inference means.

10. The apparatus for controlling a damper clutch of claim 9, wherein said control means disengages said damper clutch when the membership function of a fuzzy logic based on vehicle operation represents an engine braking state or an emergency braking state.

11. The apparatus for controlling a damper clutch of claim 9, wherein the membership function includes gear position, throttle valve position, degree of brake operation and vehicle speed.

12. The apparatus for controlling a damper clutch of claim 9, further comprising:
   determining means for determining whether a brake of said vehicle is being applied,
   wherein said inference means infers only when said determining means determines that said brake of said vehicle is being applied.

13. The apparatus for controlling a damper clutch of claim 9, further comprising:
   shift determining means for determining whether to shift an automatic transmission of said vehicle based on the sensed vehicle operating conditions,
   said control means prohibiting a shift determined by said shift determining means when said inference means determines to apply said damper clutch.

14. The apparatus for controlling a damper clutch of claim 13, wherein said shift determining means uses fuzzy logic to determine whether to shift said automatic transmission.

15. The apparatus for controlling a damper clutch of claim 9, wherein said inference means first infers whether to effect engine braking, second infers an amount of braking desired by an operator of said vehicle, and determines to apply said damper clutch when the first and second inferences indicate that emergency braking should be performed.

16. The apparatus for controlling a damper clutch of claim 15, further comprising:

shift determining means for determining whether to shift an automatic transmission of said vehicle based on the sensed vehicle operating conditions, said control means controls said automatic transmission according to an output of said shift determining means when said inference means does not either one of infer to effect engine braking and determine to apply said damper clutch.

* * * * *